(12) United States Patent
Mann et al.

(10) Patent No.: US 6,269,454 B1
(45) Date of Patent: Jul. 31, 2001

(54) MAINTAINING OBJECT INFORMATION CONCURRENT WITH DATA OPTIMIZATION FOR DEBUGGING

(75) Inventors: Daniel P. Mann; Gary M. Godfrey, both of Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/187,852

(22) Filed: Nov. 6, 1998

(51) Int. Cl.[7] ............................... G06F 11/00; G06F 5/01
(52) U.S. Cl. ................................... 714/25; 710/52
(58) Field of Search .................... 714/25, 47, 43; 710/52, 129; 711/117, 118, 154; 703/21; 709/303

(56) References Cited

U.S. PATENT DOCUMENTS

| | | | |
|---|---|---|---|
| 5,471,598 | * 11/1995 | Quattromani et al. | |
| 5,608,867 | 3/1997 | Ishihara | 395/184.01 |
| 5,729,678 | 3/1998 | Hunt et al. | 395/183.19 |
| 5,740,398 | * 4/1998 | Quattromani et al. | |
| 5,941,971 | * 8/1999 | Carter | |

FOREIGN PATENT DOCUMENTS 0 762 276 A1  8/1996  (EP) .............. G06F/11/00

OTHER PUBLICATIONS

*International Search Report*, PCT/US99/14816, Oct. 28, 1999, 3 pp.

\* cited by examiner

*Primary Examiner*—Gopal C. Ray
(74) *Attorney, Agent, or Firm*—Akin, Gump, Strauss, Hauer & Feld, L.L.P.

(57) ABSTRACT

A debugging environment maintains object information (e.g., object size) concurrently with data optimization operations by a write buffer of a target system. Within the target system, a system bus is coupled between a system memory and a microcontroller. A data optimization operation by the write buffer is detected by monitoring of a merge signal of the system bus by a bus monitoring device. When a data optimization operation is detected, data optimization attributes (e.g., object information, data and address) associated with the data optimization operation are captured in the form of an object information signal responsive to a capture signal from the bus monitoring device. The data optimization attributes may be stored in either a trace cache of the target system or a memory of external trace capture equipment connected to the debug port, or a memory of the bus monitoring device. In providing the data optimization attributes external to the microcontroller, the data optimization attribute may be temporarily held by trace pins of a debug port of the microcontroller. The data optimization attributes may be extracted from the object information signal and processed by the external trace capture equipment or the bus monitoring device. By processing the data optimization attributes, pre-optimization write object values may be reconstructed.

22 Claims, 3 Drawing Sheets

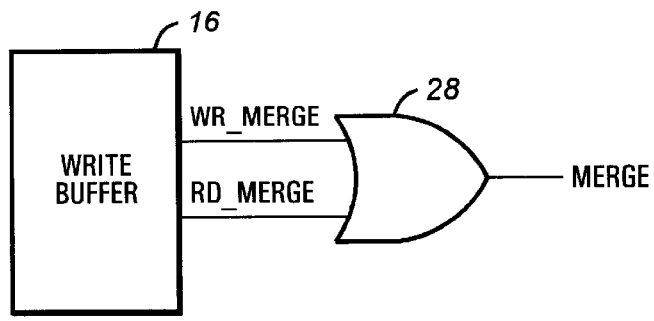
FIG. 2
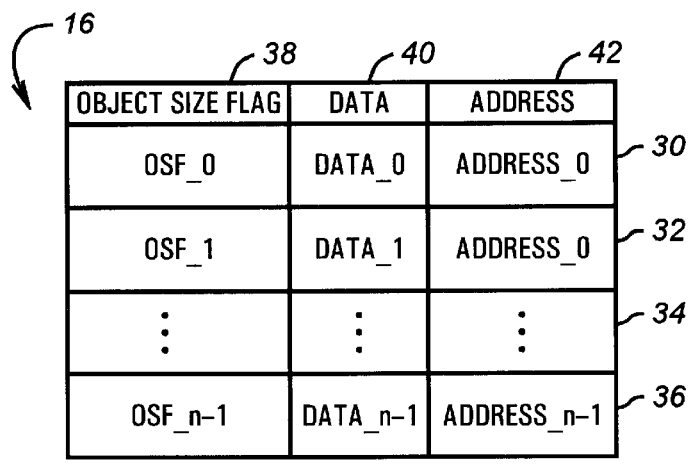
FIG. 3
| OBJECT SIZE FLAG | | |
|---|---|---|
| C | A | B |
| BYTE | 0 | 0 |
| WORD | 0 | 1 |
| DOUBLEWORD | 1 | 0 |
| — | 1 | 1 |
FIG. 4

MAINTAINING OBJECT INFORMATION CONCURRENT WITH DATA OPTIMIZATION FOR DEBUGGING

BACKGROUND OF THE INVENTION

1. Field of the Invention

The present invention relates to debugging of software for processor-oriented systems, and more particularly to maintaining object information concurrent with data optimization.

2. Description of the Related Art

In order to improve performance of a processor-oriented system, there has been an effort to decouple processor performance from the limitations of system bus performance. This effort has been pursued by providing a write buffer to control access to a system resource of a processor-oriented system. Read operations are normally given the highest priority for access to a system bus. Other accesses to a system bus such as write operations result in a delay of write data in a write buffer until the system bus becomes available.

A write buffer has increasingly been provided in processor-oriented systems to perform data optimization operations such as write merging, write collapsing, and read merging for maintaining data coherency. One candidate for queuing in a write buffer is a write object value. As a result of data optimization operations involving write object values, object size information for write object values has been lost. That is, the optimized object values no longer accompany the corresponding object size information. For example, if a write buffer merges two consecutive byte-sized object values into a single word-sized object value, then the write buffer loses the object size of the original object values, as the new data object is word-sized rather than byte-sized.

The object size information lost as a result of data optimization operations has been a limiting factor in debugging a software program of a processor-oriented system. A software program executed by a processor-oriented system has been used to perform write operations on data objects. When a software program does not utilize data optimization, the software program has typically been debugged by tracing or tracking write object values resulting from write operations. Reconstruction of write object values in debugging a software program, however, has been constrained by data optimization operations by a write buffer. A write object value resulting from a data optimization operation bas lacked the object size information necessary to reconstruct pre-optimization write object values.

SUMMARY OF THE INVENTION

Briefly, a debugging environment in accordance with the present invention maintains object information concurrent with data optimization operations by a write buffer of a target system. Within the target system, a system bus is coupled between a system memory and a microcontroller. A data optimization operation by the write buffer is detected by monitoring of a merge signal of the system bus by a bus monitoring device. When a data optimization operation is detected, data optimization attributes (e.g., object information, data, and address) associated with the data optimization operation are captured in the form of an object information signal responsive to a capture signal from the bus monitoring device. The data optimization attributes may be stored in either a trace cache of the target system or a memory of external trace capture equipment connected to the debug port, or a memory of the bus monitoring device. In providing the data optimization attributes external to the microcontroller, the data optimization attribute may be temporarily held by trace pins of a debug port of the microcontroller. The data optimization attributes may be extracted from the object information signal and processed by the external trace capture equipment or the bus monitoring device. By processing the data optimization attributes, pre-optimization write object values may be reconstructed.

BRIEF DESCRIPTION OF THE DRAWINGS

A better understanding of the present invention can be obtained when the following detailed description of the invention is considered in conjunction with the following drawings, in which:

FIG. 2 is a schematic diagram depicting a write buffer of FIG. 1 in relation to a merge signal in accordance with the present invention;

FIG. 3 is a schematic illustration of the write buffer of FIGS. 1 and 2 in accordance with the present invention;

FIG. 4 is a logic table of an exemplary object size flag of FIG. 3 in accordance with the present invention;

DETAILED DESCRIPTION OF INVENTION

Related Applications

The following related patent applications are hereby incorporated by reference as if set forth in their entirety:

Commonly-assigned U.S. patent application, Ser. No. 09/008,394, filed Jan. 16, 1998, and entitled "WRITE-BUFFER FIFO ARCHITECTURE WITH RANDOM ACCESS SNOOPING CAPABILITY";

Commonly-assigned U.S. patent application, Ser. No. 08/992,610, filed Dec. 17, 1997, and entitled "MICROPROCESSOR-BASED DEVICE INCORPORATING A CACHE FOR CAPTURING SOFTWARE PERFORMING PROFILING DATA";

Commonly-assigned U.S. patent application, Ser. No. 08/949,897, filed Oct. 14, 1997, and entitled "TRACE CACHE FOR A MICROPROCESSOR-BASED DEVICE"; and Commonly-assigned U.S. patent application, Ser. No. 08/932,597, filed Aug. 25, 1997, and entitled "SOFTWARE DEBUG PORT FOR A MICROPROCESSOR."

Figure 1:
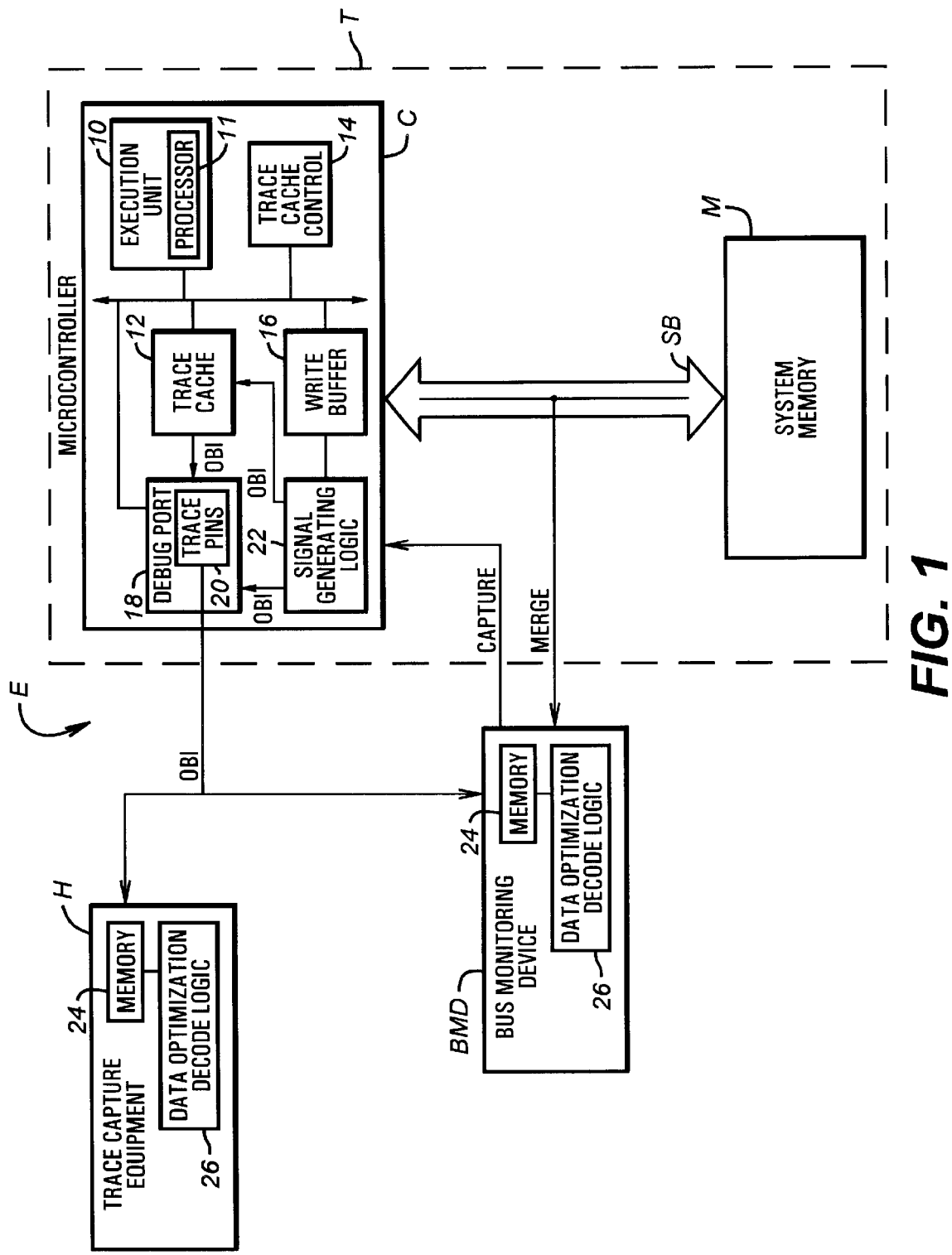
FIG. 1 is a schematic diagram of an exemplary software debugging environment in accordance with the present invention.

Referring to FIG. 1, an exemplary software debugging environment E in accordance with the present invention is shown. The software debugging environment E provides a target system T, a host system H, and a bus monitoring device BMD. In the disclosed embodiment, the target system T includes a microcontroller C coupled to a system memory M through a system bus SB. Alternatively, in place of the microcontroller C, the target system T may provide a different embedded processor device. The disclosed microcontroller C includes an execution unit 10, a trace cache 12, a trace cache control block 14, a write buffer 16, a debug port 18, and signal generating logic 22 for generating an object information signal (OBI) in accordance with the present invention. Certain components of the microcontroller C which are not necessary to gain a full understanding of the present invention have been omitted.

The execution unit 10 may provide a highly integrated processor 11 for executing code stored by the system memory M. The execution unit 10 in the disclosed embodiment is compatible with the Am186 instruction set implemented in a variety of microcontrollers from Advanced Micro Devices, Inc. of Sunnyvale, Calif. A variety of other execution units could be used instead of the execution unit 10.

In accordance with the present invention, the trace cache 12 and the trace cache control block 14 cooperate to capture data optimization attributes concurrent with a data optimization operation. Details concerning data optimization attributes are provided below. Data optimization attributes stored in the ace cache 12 may be provided to the host system H, or alternatively, the target system T may be configured to examine the data optimization attributes in the trace cache 12 internally. Further, trace capture by the trace cache 12 may be selectively enabled and disabled. It is contemplated that the trace cache 12 may be a first-in, first-out (FIFO) circular cache. The trace cache is further described in commonly-assigned U.S. patent application, Ser. No. 08/992,610, entitled "MICROPROCESSOR-BASED DEVICE INCORPORATING A CACHE FOR CAPTURING SOFTWARE PERFORMING PROFILING DATA", commonly-assigned U.S. patent application, Ser. No. 08/949,897, entitled "TRACE CACHE FOR THE MICROPROCESSOR-BASED DEVICE", and commonly-assigned U.S. patent application, Ser. No. 08/932,597, entitled "SOFTWARE DEBUG PORT FOR A MICROPROCESSOR."

The debug port 18 preferably uses an IEEE-11.49.1-1990 compliant JTAG interface or other similar standardized serial port interface. The debug port 18 is capable of utilizing the trace cache 12. The debug port 18 may include a variety of registers such as a transmitting register (TX-DATA), a receiving register (RX-DATA), an instruction trace configuration register (ITCR), and a debug control-status register (DCSR). The transmitting register holds data to be transmitted from the microcontroller C, and the receiving register stores data received by the microcontroller C. The instruction trace configuration register provides for enabling, disabling and configuration of trace debug functions. The debug control-status register provides an indication of when the execution unit 10 has entered a debug mode. In accordance with the present invention, the debug port 18 further provides trace pins 20 for temporarily holding data optimization attributes to be provided externally. Like the trace cache, the debug port is further described in the patent applications referenced above.

The write buffer 16 (FIGS. 1, 2, and 3) is preferably a write buffer with random access snooping capability. The write buffer 16 supports write merging, write collapsing, and read merging. A write merge or write collapse operation may be performed in response to assertion of a WR_MERGE signal (FIG. 2). A read merge operation may be performed in response to assertion of an RD_MERGE signal (FIG. 2). The write buffer 16 includes a random access memory. In addition to storing a write address, an address rank of the random access memory may provide bits for debugging purposes. In accordance with the present invention, bits representing object information (e.g., object size) may be supported in the random access memory. The write buffer is further described in commonly-assigned U.S. patent application, Ser. No. 09/008,394, entitled "WRITE-BUFFER FIFO ARCHITECTURE WITH RANDOM ACCESS SNOOPING CAPABILITY."

Figures 5, 6:
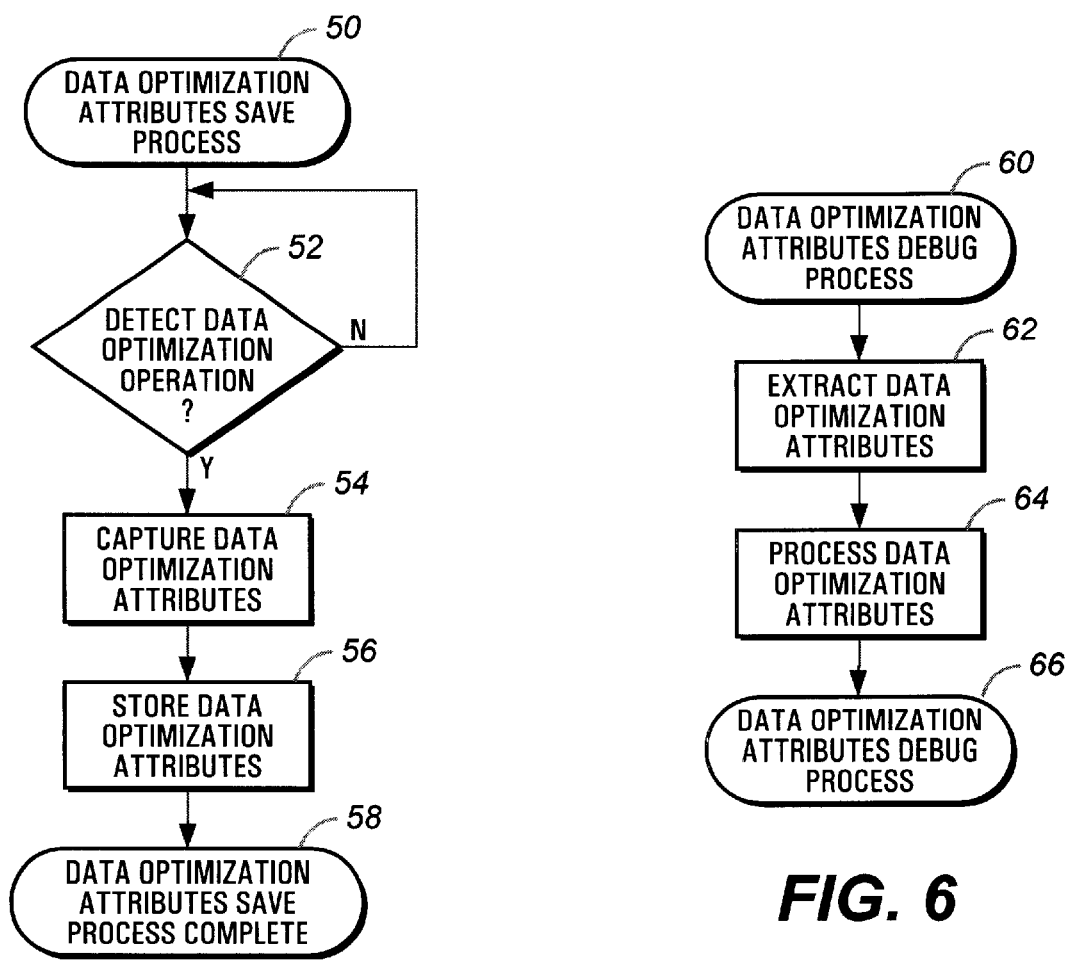
FIG. 5 is a flow chart of a data optimization attributes save process in accordance with the present invention.
FIG. 6 is a flow chart of a data optimization attributes debug process in accordance with the present invention.

In accordance with the present invention, object information is maintained concurrent with data optimization by the write buffer 16. Referring to FIG. 5, a flow chart of a data optimization attributes save process in accordance with the present invention is shown. Beginning in step 52, it is determined if a data optimization operation has been performed. Data optimization operations (e.g., write merging or read merging) are detected by monitoring a MERGE signal (FIGS. 1 and 2) of the system bus SB. Referring to FIG. 2, the disclosed MERGE signal is an output of an OR logic gate 28 receiving the WR_MERGE signal and the RD_MERGE signal as inputs. It should be understood that other configurations of the MERGE signal are possible, If either the WR_MERGE signal or the RD_MERGE signal is asserted, then the MERGE signal is asserted to indicate detection of a data optimization operation. Returning to FIG. 5, if a data optimization operation is not detected, then control remains at step 52. When a data optimization operation is detected in step 52, data optimization attributes associated with the data optimization operation are captured in step 54.

Referring to FIG. 3, a schematic illustration of the write buffer 16 storing exemplary data optimization attributes is shown. Data optimization attributes generally refer to information associated with a data optimization operation that may be used to reconstruct pre-optimization values. The disclosed exemplary data optimization attributes include the data resulting from a data optimization operation stored in a data field DATA, the address of the particular data stored in an address field ADDRESS, and the object size of the particular data stored in an object size flag field OSF. It is possible that object information other than object size may also be defined as data optimization attributes. In the illustrated embodiment, a data portion 40 of the write buffer 16 provides a column of data fields DATA; an address portion 42 of the write buffer 16 provides a column of address fields ADDRESS; and an object size flag portion 38 of the write buffer 16 provides a column of object size flag fields OSF. All ranks 30, 32, 34 and 36 of the write buffer 16 may include fields corresponding to the data portion 40, the address portion 42, and the object size flag portion 38.

Referring to FIG. 4, an exemplary logic table for an object size flag is shown. The disclosed object size flag provides two bits designated as A and B. The meaning of each bit combination AB is designated as C. The bit combination of '00' indicates a byte object size for corresponding data. The bit combination of '01' indicates a word object size for the corresponding data. The bit combination of '10' indicates a double word object size for the corresponding data. The bit combination of '11' is undefined. It should be understood that these bit combinations are illustrative and not exhaustive.

Returning to FIG. 1, the signal generating logic 22 generates an object information signal OBI for use in capturing the data optimization attributes. The signal generating logic 22 essentially combines the contents of the object size flag field OSF, the data field DATA, and the address field ADDRESS (FIG. 3) to form the object information signal OBI. In this way, the appropriate data optimization information for maintaining object information may be captured. As illustrated, the signal generating logic 22 may provide the object information signal OBI to the trace cache 12. The trace cache 12 may provide the object information signal OBI to the trace pins 20 of the debug port 18. The object information signal OBI is temporarily held by the trace pins 20. From the trace pins 20, the object information signal OBI is provided to a memory 24 of the host system H or a memory 24 of the bus monitoring device BMD. The signal generating logic 22 alternatively may provide the object information signal OBI externally through the trace pins 20 of the debug port 18.

Returning to FIG. 5, control next proceeds to step 56 where the data optimization attributes are stored. In the disclosed embodiment, the data optimization attributes may be stored in the trace cache 12, the memory 24 of the host system H, or the memory 24 of the bus monitoring device BMD. From step 56, the data optimization attributes save process is completed in step 58.

In the disclosed embodiment, object information is maintained in a non-intrusive and transparent manner as detection of a data optimization operation is handled external to the target system T by the bus monitoring device BMD. The bus monitoring device BMD is capable of detecting a data optimization operation by the write buffer 16 by monitoring the MERGE signal. When a data optimization operation occurs, the bus monitoring device BMD provides a CAPTURE signal to the microcontroller C to indicate data optimization attributes associated with the detected data optimization operation should be captured. Responsive to the CAPTURE signal, the signal generating logic 22 generates an object information signal OBI and the trace cache control block 14 prepares the trace cache 12 to receive the object information signal OBI.

Referring to FIG. 6, a flow chart of a data optimization attributes debug process in accordance with the present invention is shown. Beginning in step 62, the data optimization attributes are extracted from the object information signal OBI. If the data optimization attributes are stored in the microcontroller C, then the attributes are provided to the host system H before extraction. In the disclosed embodiment, the host system H is trace capture equipment. Trace capture equipment H includes the memory 24 and data optimization decode logic 26. The data optimization decode logic 26 is specially configured to process write object values. Design and operation of general decode logic is understood in the art. As an alternative to trace capture equipment, the host system H may be other forms of software debugging equipment. Following step 62, the data optimization attributes are processed by the data optimization decode logic 26. Utilizing forward inferring or other suitable algorithms known in the art, the decode logic 26 reconstructs the original write object values from the data optimization attributes. The memory 24 and decode logic 26 may be provided by the host system H or by the bus monitoring device BMD (FIG. 1). The data optimization attributes debug process next terminates in step 66.

Thus, a debugging environment in accordance with the present invention maintains object information concurrent with data optimization operations by a write buffer 16 of a target system T. Within the target system T, a system bus SB is coupled between a system memory M and a microcontroller C. A data optimization operation by the write buffer 16 is detected by monitoring of a MERGE signal of the system bus SB by a bus monitoring device BMD. When a data optimization operation is detected, data optimization attributes (e.g., object information, data, and address) associated with the data optimization operation are captured in the form of an object information signal OBI responsive to a CAPTURE signal from the bus monitoring device BMD. The data optimization attributes may be stored in either a trace cache 12 of the target system T, a memory 24 of external trace capture equipment H connected to the debug port 18, or a memory 24 of the bus monitoring device BMD. In providing the data optimization attributes external to the microcontroller C, the data optimization attributes may be temporarily held by the trace pins 20. The data optimization attributes may be extracted from the object information signal OBI and processed by the external trace capture equipment H or the bus monitoring device BMD. By processing the data optimization attributes, pre-optimization write object values may be reconstructed. It should be understood that the present invention is applicable to any system in which data optimization operations may be performed.

The foregoing disclosure and description of the invention are illustrative and explanatory thereof, and various changes in the components, circuit elements, signals, fields, buses, registers, variables, and connections, as well as in the details of the illustrated circuitry and construction and method of operation may be made without departing from the spirit of the invention.

We claim:

1. A method of maintaining object information concurrent with a data optimization operation by a write buffer of a target system, comprising the steps of:

detecting a data optimization operation by the write buffer;

capturing a plurality of data optimization attributes associated with the data optimization operation; and storing the plurality of data optimization attributes.

2. The method of claim 1, the target system including a system memory and a microcontroller, the step of detecting a data optimization operation comprising the step of:

monitoring a merge signal of a system bus coupled between the system memory and the microcontroller.

3. The method of claim 2, further comprising the step of:

generating the merge signal from a write merge signal and read merge signal of the write buffer.

4. The method of claim 1, a target system including a system memory and a microcontroller, the capturing step comprising the step of:

generating an object information signal providing the plurality of data optimization attributes.

5. The method of claim 1, the capturing step comprising the step of:

providing an object information flag in the write buffer.

6. The method of claim 1, the target system including a microcontroller having a debug port, the storing step comprising the step of:

holding of the plurality of data optimization attributes by a plurality of trace pins of the debug port.

7. The method of claim 1, the target system including a microcontroller having a debug port, the debug port connecting the target system to external trace capture equipment, the storing step comprising the step of:

storing the plurality of data optimization attributes in a memory of the external trace capture equipment.

8. The method of claim 1, the target system including a microcontroller having a system bus coupled to a bus monitoring device, the storing step comprising the step of:

storing the plurality of data optimization attributes in a memory of the bus monitoring device.

9. A debugging environment for maintaining object information concurrent with a data optimization operation by a write buffer, comprising:

a target system, comprising:
- a microcontroller, comprising:
  - an execution unit;
  - a write buffer coupled to the execution unit for performing a data optimization operation;
  - signal generating logic for generating an object information signal providing a plurality of data optimization attributes associated with the data optimization operation; and
- a debug port for communicating with debug equipment;
- a system memory; and
- a system bus coupling the microcontroller to the system memory, comprising:
  - a merge signal line for detecting the data optimization operation;
- a bus monitoring device coupled to the merge signal line of the system bus; and
  - capture signal line coupled to the bus monitoring device for triggering capture of the plurality of data optimization attributes by the microcontroller.

10. The debugging environment of claim 9, further comprising:
debugging equipment connected to the debug port for storing the plurality of data optimization attributes.

11. The debugging environment of claim 10, wherein the debugging equipment comprises trace capture equipment.

12. The debugging environment of claim 10, the debugging equipment comprising: decode logic for reconstructing pre-optimization write object values from the plurality of data optimization attributes.

13. The debugging environment of claim 9, the bus monitoring device comprising:
decode logic for reconstructing pre-optimization write object values from the plurality of data optimization attributes.

14. The debugging environment of claim 9, the microcontroller further comprising:
a trace cache coupled to the debug port for storing the plurality of data optimization attributes.

15. The debugging environment of claim 9, wherein the write buffer is configured for performing data optimization operations.

16. A method of debugging object information for a target system, the target system including a write buffer for performing a data optimization operation, the target system generating an object information signal providing a plurality of data optimization attributes associated with the data optimization operation, the method comprising the steps of:
extracting the plurality of data optimization attributes from the object information signal; and
processing the plurality of data optimization attributes.

17. The method of claim 16, wherein the extracting step is performed by debugging equipment connected to the target system.

18. The method of claim 16, wherein the extracting step is performed by a bus monitoring device coupled to a system bus of the target system.

19. The method of claim 16, wherein the plurality of data optimization attributes comprise object size information.

20. The method of claim 16, the processing step comprising the step of: reconstructing pre-optimization write object values from the plurality of data optimization attributes.

21. A debugging environment for maintaining object information concurrent with a data optimization operation by a write buffer, comprising:
a means of detecting a data optimization operation by the write buffer,
a means of capturing a plurality of data optimization attributes associated with the data optimization operation; and
a means for storing the plurality of optimization on attributes.

22. The debugging environment of claim 21, further comprising:
a means for extracting the plurality of data optimization attributes; and
a means for processing the plurality of data optimization attributes.

* * * * *